United States Patent [19]

Vishnevsky et al.

[11] 4,453,103
[45] Jun. 5, 1984

[54] PIEZOELECTRIC MOTOR

[75] Inventors: Valdimir S. Vishnevsky; Igor A. Kartashev; Vyacheslav V. Lavrinenko; Oleg L. Boichenko; Vitaly S. Koval; Jury V. Golovyashin; Nikolai F. Serov; Leonid I. Shinkarenko; Oleg G. Jurash, all of Kiev, U.S.S.R.

[73] Assignee: Kievsky Politekhnichesky Institut, Kiev, U.S.S.R.

[21] Appl. No.: 369,180

[22] Filed: Apr. 16, 1982

[51] Int. Cl.$^3$ .............................................. H01L 41/08
[52] U.S. Cl. ...................................... 310/323; 310/328
[58] Field of Search ......... 310/321, 323, 328, 367–369

[56] References Cited

U.S. PATENT DOCUMENTS

| 4,210,837 | 7/1980 | Vasiliev et al. | 310/323 |
| 4,325,264 | 4/1982 | Sashida | 310/323 X |

FOREIGN PATENT DOCUMENTS

| 573829 | 9/1977 | U.S.S.R. | 310/328 |
| 573828 | 9/1977 | U.S.S.R. | 310/328 |
| 576625 | 10/1977 | U.S.S.R. | 310/328 |
| 577591 | 10/1977 | U.S.S.R. | 310/328 |
| 646393 | 2/1979 | U.S.S.R. | 310/328 |

Primary Examiner—Mark O. Budc
Attorney, Agent, or Firm—Lilling & Greenspan

[57] ABSTRACT

The proposed motor comprises a stator and a rotor frictionally interacting with said stator, either said stator and rotor including at least one piezoelectric oscillator. Said oscillator includes a piezoelectric element and electrodes located on the opposite surfaces of the piezoelectric element and connected to a supply source for exciting in this oscillator a resonant mode of longitudinal acoustic vibrations. The motor further includes at least two pushers, each having one end secured on said oscillator and the other end urged against a surface of frictional interaction of the rotor and stator. The piezoelectirc element used in this motor is polarized in the direction perpendicular to the surfaces of the electrodes and is positioned so that the propagation direction of the resonant mode of the longitudinal vibrations is perpedicular to the surface of frictional interaction.

43 Claims, 32 Drawing Figures

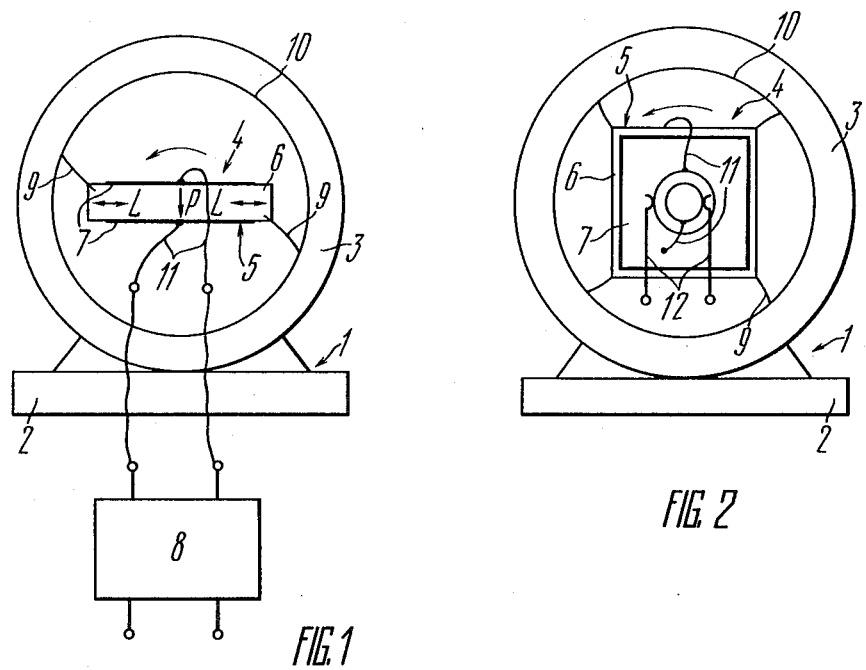

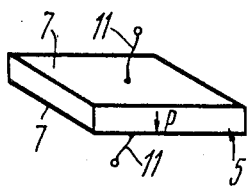
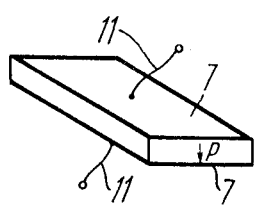
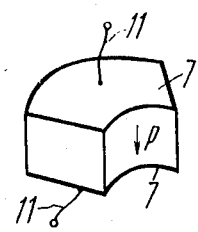
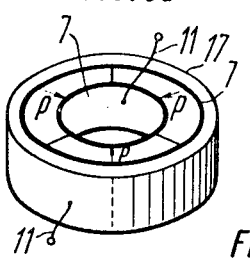
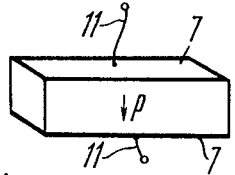
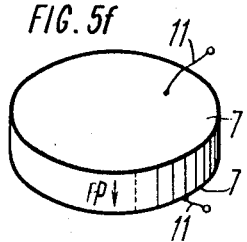
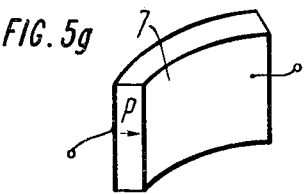
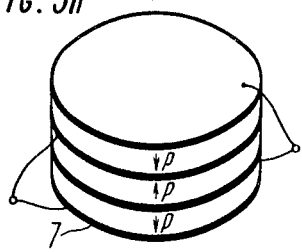
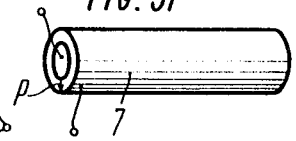
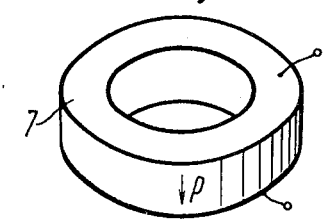
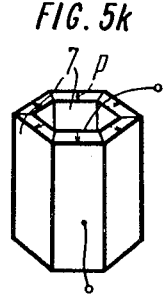

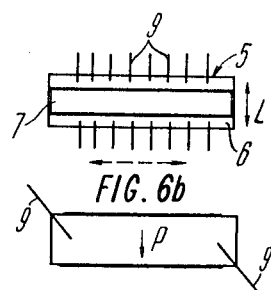
FIG. 6a
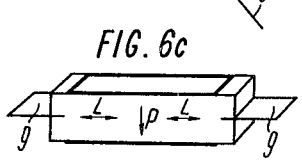
FIG. 6b
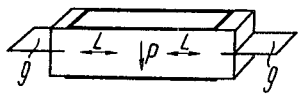
FIG. 6c
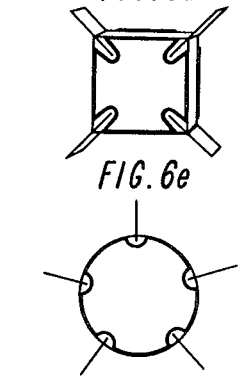
FIG. 6d
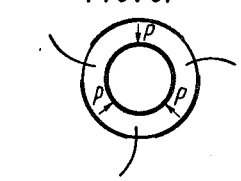
FIG. 6e
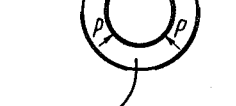
FIG. 6f
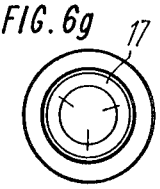
FIG. 6g
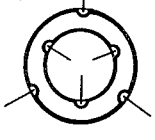
FIG. 6h
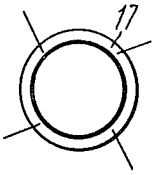
FIG. 6i
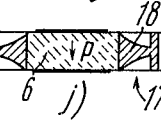
FIG. 6j
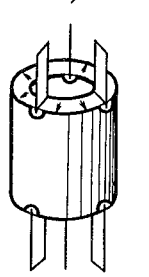
FIG. 6k
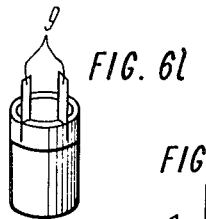
FIG. 6l
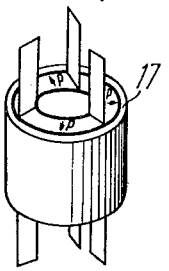
FIG. 6p
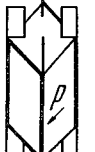
FIG. 6m
FIG. 6n
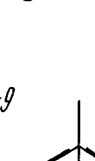
FIG. 6q
FIG. 6o

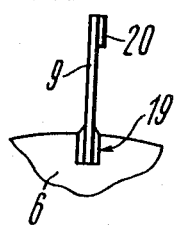 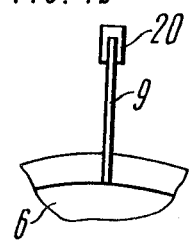 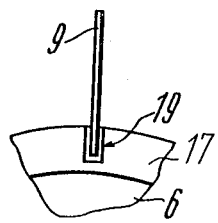
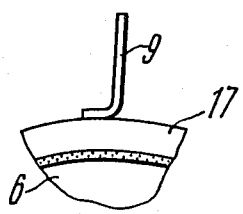 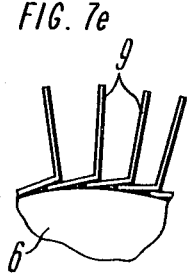 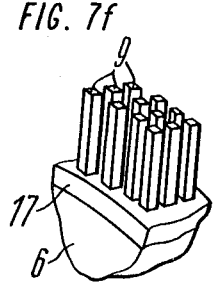
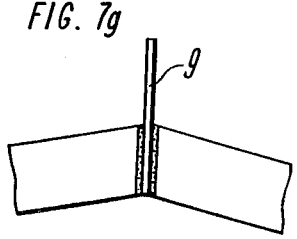

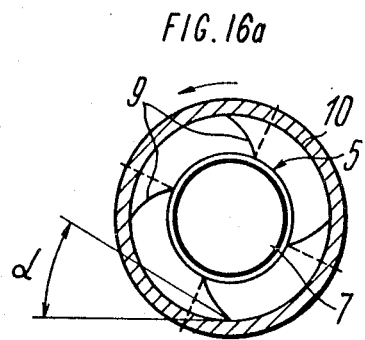
FIG. 16a
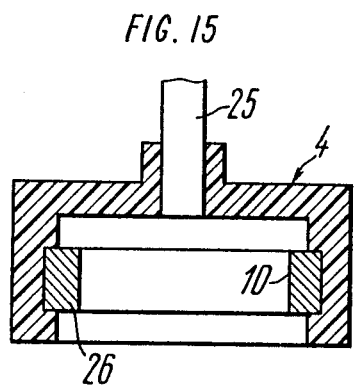
FIG. 15
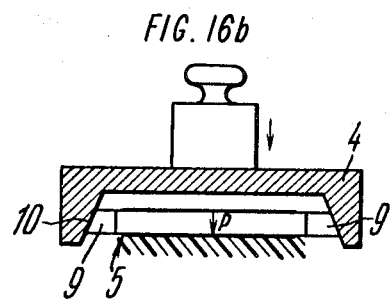
FIG. 16b
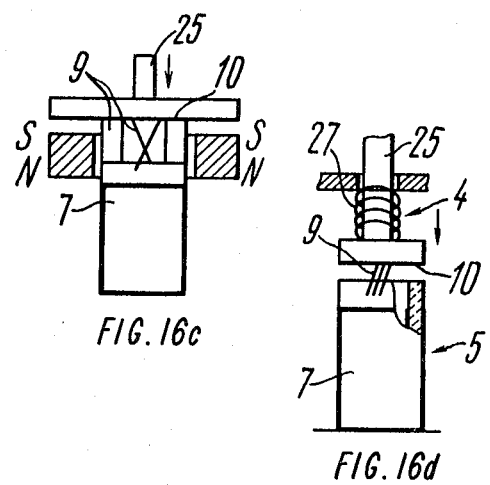
FIG. 16c
FIG. 16d

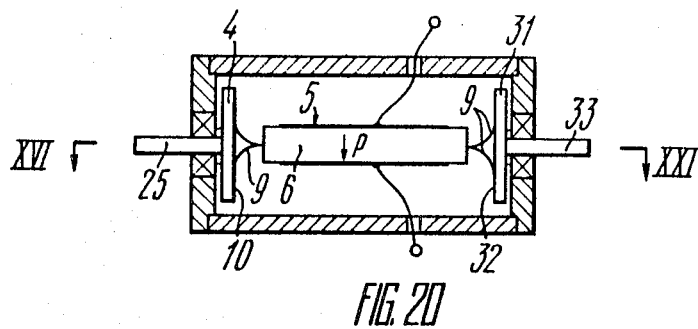
FIG. 20
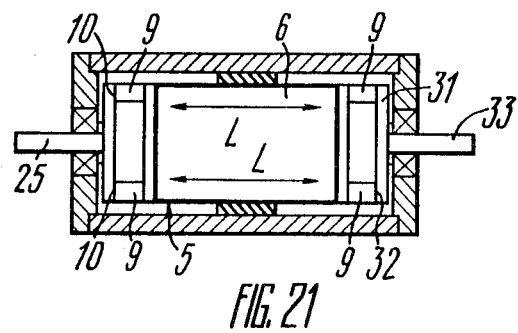
FIG. 21
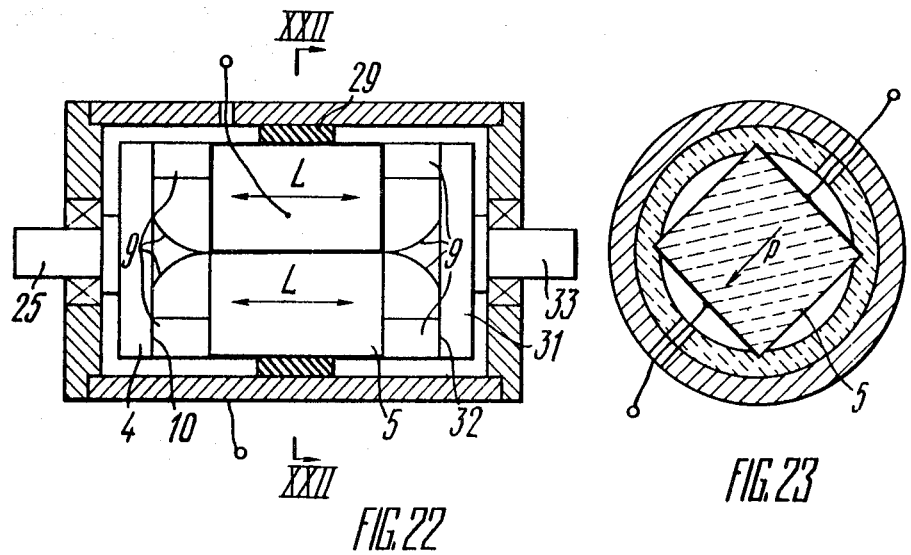
FIG. 22
FIG. 23

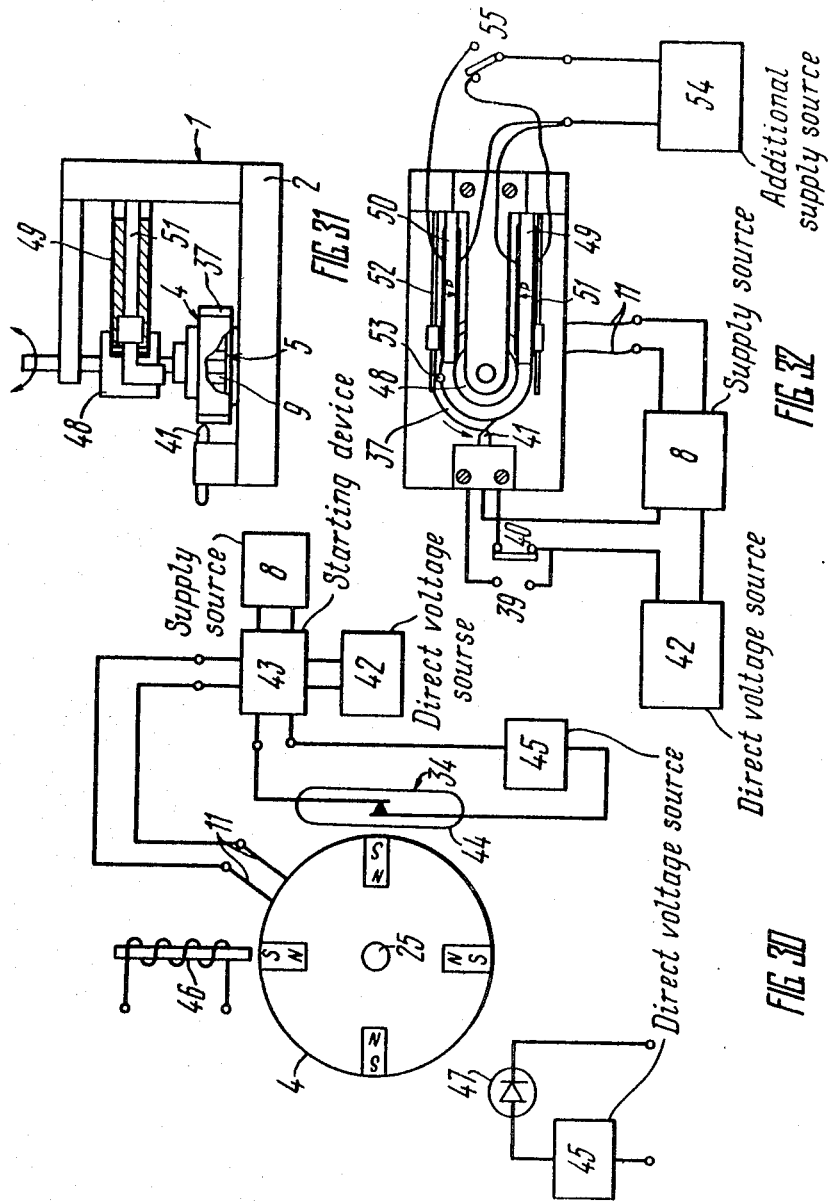

PIEZOELECTRIC MOTOR

FIELD OF THE INVENTION

The present invention relates to electric motors, and more specifically is concerned with piezoelectric motors.

A motor of the invention can be most efficiently used as a low-speed motor capable of being used without a reduction gear and rotating in a stepwise or continuous mode. Motors of this type are expected to find a wide application in actuating mechanisms of automatic systems, tape drives of tape recorders, data input-output devices, digit printing devices, cine and photographic equipment, movements, record players, etc.

DESCRIPTION OF THE PRIOR ART

There are known piezoelectric motors wherein electric energy is converted to mechanical energy in the form of angular displacements of the rotor or a continuous rotation thereof.

The stator in such piezoelectric motors is a stationary part with respect to a base plate whereon the motor is secured, while the rotor is a rotating part mounted on the stator for rotation, for instance, in bearings.

Unlike electric motors operating on electromagnetic interaction between the stator and the rotor, the piezoelectric motor operates on frictional interaction of the stator and the rotor; that is, at the expense of frictional forces, which frictional interaction takes place on a certain surface, which is referred to, hereinafter, as a surface of frictional interaction. When deenergized, such rotor can be rotated by applying thereto a moment of force sufficient to overcome said frictional forces. To develop a torque, the stator or the rotor of a piezoelectric motor is provided with a piezoelectric oscillator (sometimes is referred to as a piezoelectric vibrator) which is an electromechanical resonator comprising a piezoelectrically active part that is a piezoelectric element. The piezoelectric element is made from a mono- or polycristalline piezoelectric material electrically polarized in one direction. The said piezoelectric element also includes at least two electrodes made, for instance, in the form of thin metal coating, to which electrodes generally are connected metal leads which are used for connecting said piezoelement to an a.c. source, the frequency of which source is normally selected equal or close to a resonant frequency of the oscillator.

When the piezoelectric element is connected to a voltage source a resonant mode of elastic mechanical (acoustic) vibrations are produced therein along one of the geometric dimensions of the oscillator at the expense of a reverse piezoelectric effect, which vibrations propagate through the whole oscillator acoustically insulated within the stator.

A frictional contact between the stator and the rotor acts as a mechanical rectifier converting elastic vibrations to unidirectional pulses of angular displacements of the rotor, which unidirectional pulses are smoothed out by the mass of the rotor to produce a continous angular motion.

One of these motors is provided with an oscillator made in the form of a piezoelectric plate forced at its one end to the rotor (cf. U.S. Pat. No. 4,019,073). The motors of this type feature a high efficiency (higher than 60%). They have, however, a high supply voltage, a small range of the operating frequencies lying on the slope of the characteristic curve of the oscillator. Furthermore, the prior art motor requires complex electronic means to keep a supply frequency in the range of the operating frequencies so as to compensate for temperature or load variations, or other destabilizing factors. In addition, they have an elevated pressure of the stator on the rotor which leads to an instability in the instantaneous rotational frequency of the rotor because of beatings therein. The latter disadvantage may be removed by utilizing several oscillators, which, however, makes the motor and its supply circuit much more complex, since each piezoelectric element must be provided with a separate supply source. It should be also noted that a direct contact between the oscillator and the rotor leads to step changes in the impedance of the piezoelectric motor, which destabilize the operation of a self-excited oscillator supply circuit of the motor. At the same time, it is the self-excited circuits that provide stability of the motor operation parameters without the use of auxilliary electronic means.

The U.S. Pat. No. 4,019,073 also discloses a motor wherein the oscillator made in the form of a piezoelectric disc or ring interacts with a plurality of symmetrically mounted thin plates functioning as pushers to cause the vibrating piezoelectric element to rotate, thereby developing a torque.

These motors are provided with an oscillator of longitudinal vibrations. The longitudinal vibrations are the type of oscillations wherein elastic oscillatory displacement of particles takes place in the direction of a mechanical energy transfer, i.e. from one particle to another one, that is in the direction of the elastic wave propagation. There are also oscillators with lateral oscillations, wherein particles displace in the direction perpendicular to the direction of the elastic wave propagation. Monomorphic (homogeneous) plate, disc, bar, having each a pair of electrodes disposed on the opposite surfaces, polarized perpendicularly to the electrode surfaces, can be example of the simplest type of the oscillators with longitudinal oscillations. Similar bodies but polarized in the direction parallel to the surfaces of the electrodes to produce vibrational displacement represent the simpliest forms of the oscillators with lateral vibrations.

The prior art piezoelectric motors having oscillators with longitudinal oscillations constructed in the form of a disc or a ring interacting with pushers, have a relatively low efficiency—below 10%. This is explained by only a small portion of the energy concentrated in the piezoelectric element being transfered through an acoustic contact of the thin pusher plate with the oscillator and converted to a rotating rotor energy. The most portion of the acoustic energy is reflected from the cylindrical surface of the oscillator and is dissipated in the oscillator material, which may also explain is responsible for a relatively low power of the motor torque.

There are also known piezoelectric motors wherein the stator is provided with an oscillator of torsional vibrations relating to oscillators with lateral vibrations (cf. U.S. Pat. No. 3,211,931). This oscillator is a piezoelectric element made in the form of a hollow cylinder. The motor being considered also comprises pushers made in the form of piezoelectric plates, each having one end fastened close to one or two end faces of the piezoelectric oscillator, and the other end interacting with the cylindrical surface of the rotor. The propagation direction of the resonant mode of the lateral vibra= tions is parallel to the generating line of the rotor. This motor operates on the interaction of two types of lateral vibrations which are transverse relative each other. Since the oscillator per se induces lateral (torsional) vibrations, the second type of vibrations, which are self-exciting on the frictional contact between the stator and rotor, are longitudinal vibrations. However, the resonant frequency of the longitudinal vibrations is, at best, 1.5 times higher than the lateral vibration frequency, in which case their shift amplitude is much smaller than the shift amplitude of the lateral vibrations. This results in the pressure of the pusher upon the rotor when the latter is moving forward, being slightly greater than when said rotor is moving backward. Therefore, during a half cycle the pusher is pushing the rotor forward and during the second half of a cycle the same pusher is acting upon the rotor nearly with the same force but applied in the opposite direction, that is forcing said rotor to move back. However, the backward motion of the rotor is prevented by the inertia thereof, and all the energy during the backward motion of the pusher is converted into wear energy, thereby greatly increasing the rate of wear of the pushers and reducing the efficiency of the motor.

In addition, it should also be noted that the circumferential polarization of a hollow cylinder is difficult to realize, and such a motor has a high input impedance causing a high supply voltage, which is explained by said motors having a low operating frequency and a great distance between the electrodes. Furthermore, this motor features an elevated level of acoustic noise-creaking, which is accounted for by the fact that the cylindrical oscillator of the torsional oscillations has an oscillation velocity gradient along a generator of a cylinder. Therefore the ends of the pushers interacting with the rotor have different oscillation velocities along their width, which results during the motor running into their slippage relative the rotor. This is accompanied by strong acoustic noise, the torque decreasing and the efficiency lowering. This accounts for the pushers used in these motors having a small width (much smaller than the length of a generator of the cylinder of the oscillator). The decrease in the width of the pusher leads to noise abatement, but at the same time decreases the motor torque, lowers the efficiency of the motor, and sharply reduces the service life thereof.

SUMMARY OF THE INVENTION

The principle object of the invention is to provide a piezoelectric motor which due to constructional improvements of the piezoelectric oscillator allows its torque, efficiency and service life to be increased.

Another object of the invention is to reduce acoustic noise of the motor.

The object of the invention is attained by a piezoelectric motor comprising a stator and a rotor frictionally interacting with said stator, either one of the stator or rotor including at least one piezoelectric oscillator incorporating a piezoelectric element made from a polarized piezoelectric material, provided with electrodes disposed on the opposite surfaces of said element and connected to a supply source for exciting acoustic vibrations in said oscillator. At least two pushers are provided, each having one end secured on said oscillator and the other end forced to at least one surface of frictional interaction of the stator and rotor. According to the invention the piezoelectric element is polarized in the direction perpendicular to the surfaces of the electrodes and is positioned so that the propagation direction of the resonant mode of the longitudinal vibrations excited in the piezoelectric oscillator is perpendicular to said surface of frictional interaction.

It is expedient that the piezoelectric element be made in the form of a rectangular plate.

The piezoelectric element may be made in the form of a piece having a square section.

The piezoelectric element may be made in the form of a cylinder or a portion thereof.

It is possible that the piezoelectric element be made in the form of a ring or a portion thereof.

It is possible that the piezoelectric element be made in the form of a disc.

It is also possible that the piezoelectric element be made in the form of a cylinder from prisms.

It is possible that at least one cylindrical surface of the piezoelectric element be enveloped by a shell.

The said shell may have a difference between its inner and outer diameters, which difference is a multiple of a half the length of the longitudinal vibrations.

Furthermore, the said shell may be made in the form of a concentrator of mechanical stresses.

It is expedient that the pushers be secured at least on one end face of the piezoelectric element.

Each said pusher may also be secured on ribs of the piezoelectric element, which ribs being positioned parallel to each other.

In modifications of the proposed motor the pushers may be secured at least on one cylindrical surface of the piezoelectric element.

It is possible to provide grooves in the piezoelectric element of the proposed motor, with the pushers being secured in said grooves.

The said pushers may also be secured on the piezoelectric element with the aid of a compound.

The pushers may also be secured on the shell.

It is desirable that the pushers be made in the form of plates of a uniform thickness.

It is also desirable that the pushers be made in the form of plates of variable thickness.

The plates may be made rectangular.

The said plates may also be made trapezoidal.

The pushers may have a multilayer structure.

In modifications of the proposed motor between the layers of said pushers may be provided a sound-proofing layer.

It is also possible that the pushers be made in the form of rods.

The free ends of the pushers may be provided with a wear-resistant layer.

The length of the pushers may be a multiple of half the length of longitudinal vibrations. In a modification of the proposed motor, wherein the piezoelectric oscillator is located in the stator, the rotor may be made in the form of a cylinder against the lateral surface of which are urged the free ends of the pushers.

In another modification of the proposed motor, wherein the piezoelectric oscillator is located in the stator, the rotor may be made in the form of a truncated cone against the lateral surface of which are urged the free ends of the pushers.

In yet another modification of the proposed motor, wherein the piezoelectric oscillator is located in the stator, the rotor may be advantageously made in the form of a hollow cylinder wherein said oscillator is disposed. Furthermore, in modifications of the proposed motor the rotor may include at least one disc, to one of the surfaces of which disc are forced the pushers.

In this case at least one disc may be mounted for axial displacement and be urged against the oscillator with the aid of a spring.

It is expedient that the pushers be positioned symmetric about the axis of rotation of the rotor and at one and the same angle to the surface of frictional interaction.

The proposed motor may be provided with an additional rotor having one more surface of frictional interaction, to which surface are forced the end of the other pushers having their other ends secured on said oscillator.

In this case the angles at which the free ends of the pushers engage the frictional interaction surfaces may have identical signs.

The angles at which the free ends of said pushers engage said frictional interaction surfaces may have opposite signs.

It is also possible that the proposed motor be provided with a converter adapted to convert angular positions to electric signals, said converter being connected to a supply source.

It is also possible to provide the proposed motor with a reversible rotor mounted coaxially with said rotor and being capable of rotating relative this rotor, and also with two additional piezoelectric oscillators made in the form of rectangular plates mounted on the stator with one end and alternately frictionally interacting with said reversible rotor with the aid of two pressure elements movably connected with said rotor of the motor.

The above modifications of the proposed motor make it possible to raise the motor efficiency higher above than 30%, increase the service life of individual motors to 3000 hours, and manufacture motors capable to operate at a voltage below 1 V. These motors can provide a speed of rotation in the range of from 600 r.p.m. up to one revolution per 24 hours, and to develop a torque to 100 kg per cm. Owing to their samll size and high speed of response the proposed piezoelectric motors are suitable for use as actuating (power) drives in tape recorders, record players, toys, automatic devices, robots, prosthesis, etc.

BRIEF DESCRIPTION OF THE DRAWINGS

These and other objects had advantages of the present invention will become apparent from the following embodiment thereof and accompanying drawings, wherein:

FIG. 1 schematically represents a piezoelectric motor of the invention, wherein the piezoelectric oscillator is made in the form of a rectangular plate;

FIG. 2 shows another modification of the motor in FIG. 1;

FIG. 5 shows various modification of the piezoelectric elements used in the piezoelectric motor of the invention;

FIG. 6 shows various modifications of the oscillators having pushers secured thereon;

FIG. 7 illustrates various ways of securing the ends of the pushers on the piezoelectric oscillator;

FIGS. 14 and 15 show modifications of the rotors in the proposed piezoelectric motor;

FIG. 16 illustrates various ways of forcing the pushers to the surface of frictional interaction;

FIG. 20 is a sectional view, showing a modification of the proposed motor wherein the oscillator is made in the form of a rectangular plate, with the pushers disposed on the end faces thereof;

FIG. 21 is a sectional view taken along line XXI-—XXI in FIG. 20;

FIG. 22 is a sectional view, showing a modification of the proposed motor wherein the oscillator is made in the form of a square bar with the pushers disposed on the end faces thereof;

FIG. 23 is a sectional view taken along line XXIII-—XXIII in FIG. 21.

FIG. 30 shows a modification of the proposed motor provided with a starting device to start and stop the rotor;

FIG. 31 schematically represents a reversible motor of the invention; and

FIG. 32 is similar to FIG. 31, but also including a connection diagram according to the invention.

DETAILED DESCRIPTION OF THE INVENTION

Figure 3:
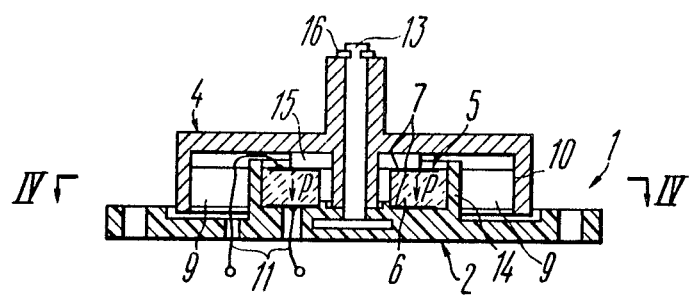
FIG. 3 is a sectional view, showing the construction of the proposed piezoelectric motor, wherein the oscillator is made in the form of a ring and secured on the stator.

A piezoelectric motor, shown in FIG. 1, comprises a stator 1 which is a stationary part of the motor and includes a base 2 and a body 3. The base 3 is intended for securing the motor in its working position on a mounting. The motor also includes a rotor 4 which is a rotating part of the motor. In the motor shown in FIG. 1 the rotor includes a piezoelectric oscillator 5 having a piezoelectric element 6 made in the form of a rectangular plate from a polarized piezoelectric material. Disposed on the opposite surfaces of this plate are electrodes 7 connected to a supply source 8 for exciting acoustic (elastic) vibration waves in the oscillator 5. According to the invention the piezoelectric element 6 is polarized in the direction perpendicular to the electrode 7 surfaces (in the drawings the direction of polarization is shown by arrows P). The motor is provided with two pushers 9, each having one end secured on the rib of the piezoelectric element 6 plate so that said ends of the pushers are located on the diagonally opposite ribs. The other ends of the pushers are forced to a surface of frictional interaction 10 which is a portion of the inner cylindrical surface of the body 3 of the motor.

In the above modification of the proposed motor the oscillator 5 is an oscillator of acoustic longitudinal vibrations (hereinafter referred to as a longitudinal vibration oscillator) excited along the length of the piezoelectric element 6 plate, wherein the propagation direction of the resonant mode wave of acoustic longitudinal vibrations coincides with the longitudinal axis of the piezoelectric element 6. (The direction of propagation of the resonant mode of the longitudinal acoustic vibrations is shown in the drawings by the arrows L).

(The term "resonant mode of longitudinal acoustic vibrations" in this specification is used to mean acoustic vibrations having such a frequency at which there occurs a maximum amplitude of displacement of particles in the direction of mechanical energy transfer from a particle to another one, that is in the direction of propagation of an elastic wave, and therefore a longitudinal acoustic oscillator such an oscillator wherein along one of the geometric dimensions thereof there can be excited a resonant mode of longitudinal acoustic vibrations).

According to the invention the oscillator 5 is positioned so that the propagation direction of the resonant mode of longitudinal acoustic vibrations excited therein (in FIG. 1-along the length of the plate of the piezoelectric element 6) is perpendicular to the surface 10 of frictional interaction.

In the longitudinal vibration oscillator 5 with vibrations propagating along the length of the piezoelectric element 6, there is no gradient of the vibration velocity along the width thereof, that is why the pushers 9 may be mounted along all its width, which allows the surface of frictional contact between the rotor 4 and the stator 1 to be increased, thereby proportionally increasing the motor torque and improving the load matching of the oscillator 5, and hence improving the efficiency of the motor. The weight and dimensions of the motor may also be advantageously decreased.

The moment of inertia of the rotor 4 comprising the oscillator 5 is normally lower than that of the stator 1. Therefore the motor wherein the oscillator 5 is disposed on the rotor 4 has a higher speed of response. However, the rotor 4 of such a motor is capable of doing only angular displacement and not of rotating, since otherwise the leads 11 of the electrodes 7 will be twisted and broken. To prevent this the rotor must be provided with a current collector 12, which makes the construction of the motor more complex, (FIG. 2).

Shown in FIG. 2 is a motor wherein the piezoelectric element 6 is made in the form of a square plate, with the pushers 9 being secured on the lateral ribs of said plate.

In both the above modifications (FIGS. 1, 2) the oscillator 5 is fixed on the shaft of the motor, which shaft is mounted in bearings in the body 3 (the shaft and bearings are not shown in FIGS. 1, 2).

Figure 4:
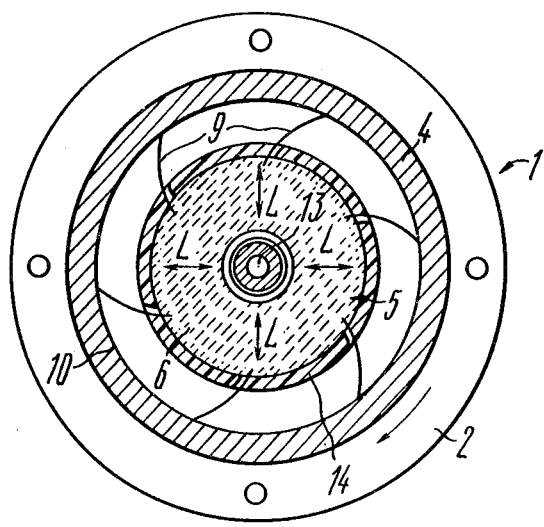
FIG. 4 is a sectional view taken along line IV—IV in FIG. 3.

Modifications of the proposed motor are also possible wherein the oscillator 5 may be mounted on the base 2 of the stator 1 (FIGS. 3, 4). The rotor 4 in such motors is made in the form of a sleeve mounted for rotation about the shaft 13 press-fitted in the base 2 of the stator 1. The oscillator 5 is made in the form of a ring, with the pushers 9 each having one end secured on the outer lateral surface of said ring and its other end forced to the inner cylindrical surface of the rotor 4, which surface being the surface 10 of frictional interaction. The electrodes 7 are applied onto the flat surfaces of the ring polarized through the thickness thereof. In this case the oscillator 5 is a longitudinal vibration oscillator wherein the longitudinal vibrations are excited along the radius of the ring, i.e. a radial vibration oscillator, since the radial vibration is a variety of the longitudinal vibrations. The direction of propagation of such vibrations in this modification is perpendicular to the surface 10.

On the base 2 of the stator 1 is located a holder 14 of the oscillator, which holder is made in the form of an annular projection having grooves wherein the pushers are disposed so as to prevent the rotation of the piezoelectric element during operation of the motor. In the axial direction the oscillator 5 is held in place at one side by the base 2, and at the other side by a washer 15, the rotor 4, and a retaining ring 16.

According to the invention the piezoelectric elements of the longitudinal vibration oscillator in the proposed motor may be variously constructed. The piezoelectric element may be made in the form of a square plate (FIG. 5a) or a rectangular plate (FIG. 5b), or a bar (FIG. 5e), hollow cylinder (FIG. 5i), a disc (FIG. 5f), a ring (FIG. 5j), or a portion of a ring (FIG. 5c), a portion of a cylinder (FIG. 5g) or a composite ring (FIG. 5d) made from separate portions of a ring, or a composite cylinder (FIG. 5k) built up of separate prisms. The electrodes 7 of the piezoelectric elements are disposed on the opposite surfaces thereof, for instance, on the parallel faces (FIGS. 5a, b, e, k), parallel cylindrical surfaces (FIGS. 5d, g, i), or parallel flat surfaces (FIGS. 5c, f, h, j).

According to the invention in modifications of the proposed motor the piezoelectric element is polarized in the direction perpendicular to the surfaces of the electrodes. When the electrodes are connected to a supply source the magnetic intensity vector of the electric field exciting acoustic vibrations coincides with the polarization direction of the piezoelectric element, which is necessary for electrically exciting the longitudinal acoustic vibrations.

A piezoelectric element made in the form of a rectangular plate (FIGS. 5a and b) or a disc (FIG. 5f) permits the electrodes to be located on the wide surfaces of said plate, which allows the supply voltage of the motor to be lowered.

The supply voltage can be lowered even more by making the piezoelectric element multilayered (FIG. 5h).

In the case of motors with a low power consumption and a high torque it is expedient that the piezoelectric element be made in the form of a portion of a ring (FIG. 5c) or a portion of a hollow cylinder (FIG. 5g).

To obtain a high power of the motor the piezoelectric element is built up from portions of a ring (FIG. 5d) or prisms (FIG. 5k).

If the piezoelectric element has cylindrical surfaces a shell 17 may be provided on these surfaces.

To improve the mechanical strength said shell 17 may be disposed on the outer cylindrical surface of the ring (FIG. 5d). (In this case said shell 17 is made in the form of a ring).

The piezoelectric oscillator in the motor of the invention substantially includes a piezoelectric element with electrodes and leads, and said shell enveloping the cylindrical surface of the piezoelectric element.

To the electrodes applied on the surfaces of the piezoelectric elements are connected leads 11 which are flexible conductors.

The improvement in the proposed motor consists in that the piezoelectric oscillator is made in the form of a longitudinal vibration oscillator, and the pushers are mounted on ribs or surfaces of said oscillator, having a maximum vibration velocity of the longitudinal vibration resonant mode.

In modifications of the proposed motor the pushers 9 may be mounted on the faces of the piezoelectric element 6 (FIG. 6a), on one of its end faces (FIG. 6l), or on its two end faces (FIGS. 6c, k, m, p, q). They also may be mounted on the parallel ribs of the piezoelectric element 6 (FIGS. 6b, d, o). When the piezoelectric elements 6 are made in the form of discs or rings, the pushers 9 are preferably mounted on the cylindrical surfaces: on the outer cylindrical surface (FIGS. 6e, f), inner cylindrical surface (FIG. 6g) or on both the outer and inner cylindrical surfaces (FIG. 6h).

The pushers may be positioned relative the surfaces of the piezoelectic elements perpendicularly (FIGS. 6a, e, f, g, h, j, k, l, m, n, p, q) or inclined (FIGS. 6b, d, i, o).

When the piezoelectric element is provided with a shell 17 located on the piezoelectric element cylindrical surfaces, the pushers 9 may be located on said shell (FIG. 6f).

The shell 17 is generally made of metal, for instance, of steel. According to the invention for increasing the velocity of vibration at the end of the pusher, the difference between the inner and outer diameters of the shell is selected so that it constitutes a multiple of a half the length of the resonant mode wave of the longitudinal vibrations excited in the oscillator. Even higher speed may be obtained by the shell 17 being made in the form of a mechanical stress concentrator 18 (FIG. 6j). The stress concentrator 18 is a rim having a section converging in the direction in which the rim radius is increasing, for instance, trapezoidal section. The increase in the vibration-velocity leads to the increase in the speed of rotation of the proposed motor.

The pusher ends may be variously secured on the piezoelectric oscillator.

In the oscillator 5 there may be provided grooves 19 (FIGS. 7a, c), in which are secured the ends of the pushers 9. The grooves 19 may be made either in the piezoelectric element 6 proper (FIG. 7a) or in the shell 17 (FIG. 7c).

A modification of the proposed motor is possible wherein the pushers are secured with the aid of a layer of compound, said compound may be based on epoxy resin (FIG. 7b), which simplifies the manufacture and increases the strength of the piezoelectric elements.

The pushers according to the present invention are preferably made in the form of rods as shown in FIG. 7f.

According to the invention the shell 17 may be variously secured on the piezoelectric element 6. For instance, the shell 17 may be press-fitted onto the piezoelectric element (FIG. 7c) or bonded thereto (FIG. 7d). The pushers are bonded in (soldered in) said shell (FIG. 7c) or welded thereto (FIG. 7d). The shell may be formed by the pushers, as shown in FIG. 7e, which also is one of the modifications used in practice.

In the oscillators having piezoelectric elements built up of prisms the pushers are secured with the aid of an adhesive while the oscillator is being assembled (FIG. 7g).

In order to increase the service life of the motor, wear-resistant layers 20 are provided on the free ends of the pushers (FIG. 7a), which wear-resistance layer may be composed, for instance, of materials based on tungsten carbide, titanium carbide, and the like. For noise abatement the wear-resistant layer 20 is generally formed from organic compounds of plastic materials, in which case this layer is applied by moulding (FIG. 7b).

The method of securing the pushers to the shell should be selected depending on what is more suitable from the point of view of technology. As regards the advantages, all these alternatives are nearly equivalent.

Generally, the pushers are made from a sheet steel of a uniform thickness. They also may be made from a plastic material, such as, for instance, paper-based laminate.

The thickness of the pushers made of metal does not exceed 1/40 of the wave length of the acoustic vibrations excited in the oscillator, while that of the pushers made from plastic material does not exceed 1/20 of said wave length. The main modifications of the pushers are shown in FIG. 8.

Figure 8A:
FIG. 8 shows various modifications of the pushers.
Figure 8B:
Figure 8C:
Figure 8D:
Figure 8E:
Figure 8F:

The pushers in the proposed motor are preferably made in the form of rectangular plates, as shown in FIG. 8a, or in the form of trapezoidal plates, as shown in FIG. 8f. The pushers may also have stamped stiffening ribs, as shown in FIG. 8b.

Figure 8G:

The pushers made in the form of a trapezoidal plate make it possible to reduce irregularity of bending of said pushers when these are mounted on the motor and make easier the fixing of the oscillator in the stator. For fixing the oscillator in the stator, the pushers are provided with projections, as shown in FIG. 8c. A better bond between the pusher and the compound is achieved by the pushers being split at the ends and the latter are slightly parted, as shown in FIG. 8d. For the same purpose the ends of the pushers may be provided with through holes, as shown in FIG. 8e. In the pushers which are interacting simultaneously with two rotors, a slot is made in the middle of said pushers as shown in FIG. 8g.

The pushers may be made in the form of plates of a variable thickness, which thickness is decreasing towards the free end of the pusher. Such construction of the pusher permits irregularity of the pusher bending to be decreased.

It is also possible to form the multilayered pushers (FIG. 9a) in which case several pushers are inserted in one and the same groove. Furthermore, if the pusher is made of metal the metal plate of the pusher may be positioned between the sound-proofing layers 21 formed from an organic material (FIG. 9b) having a good sound attenuation, thereby contributing to a noise abatement in the motor. The pusher may be made up of several metal plates, which enables the motor torque to be increased (FIG. 9c). It is expedient that these pushers be insulated by sound-proofing layers, as shown in FIG. 9c.

The layers 21 may be mechanically injoined or spaced relationship with respect to each other. In the latter case, the pressure exerted by the pusher onto the surface of frictional interaction located on the rotor (or stator) is decreased several times.

If the pushers are mounted on the outer surfaces of the oscillator, the length of the pushers determines the size of the motor. Therefore, generally the length of the pushers is selected in the range of ⅛ and less of the wave length of the acoustic vibrations excited in the oscillator. When the size of the motor is not limited, it is expedient that the length of the pushers be a multiple of half the length of said wave, which provides for a maximum torque or rotation velocity of the rotor.

It is expedient that the oscillator, when mounted either on the stator or rotor, have the minimum radial displacement and the minimum, angular displacement relative the axis of rotation.

Figure 10A:
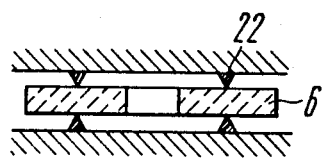
FIGS. 10, 11, 12 and 13 illustrate various ways of securing piezoelectric elements on the stator or rotor.

Rigid securing of the oscillators having piezoelectric elements made in the form of discs or rings is effected with the aid of conical holders 22 made from sound-proofing materials, for instance, rubber, fluoroplastic and the like (FIG. 10a). In this case it is advisable that one ring be made of elastic material (rubber), and the other one of a relatively hard sound-proofing material, for instance, fluoroplastic.

Figure 10B:
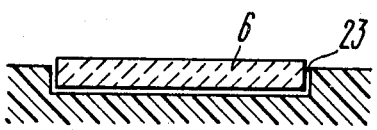
Figure 10C:
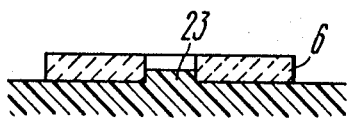

Loose mounting of the oscillator, whereby the oscillator is allowed to be slightly displaced within the body makes the construction of the motor more simple. Thus, in the case of loose mounting of the oscillator made in the form of a disc, as shown in FIG. 10b, or a ring as shown in FIG. 10c, the stator or rotor is provided with an arrester 23 (FIG. 10b, c) to hold the oscillator in position and to prevent it from radial displacement. Shown in FIG. 10b is an arrester 23 made in the form of a recess wherein the disc of the oscillator is located, and shown in FIG. 10c is an arrester 23 made in the form of a projection embraced by the ring of the oscillator.

Figure 11A:
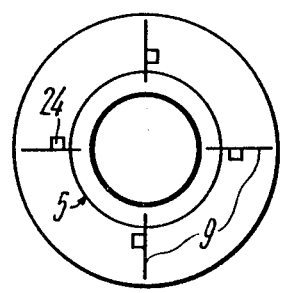

The angular displacement of the oscillator can be prevented with the aid of an annular holder 14, such as that shown in FIG. 11a, and in FIGS. 3, 4.

Figure 11B:
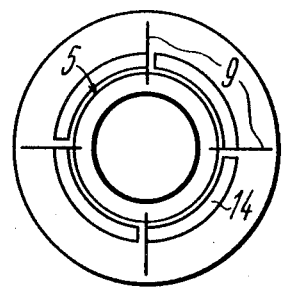

Instead of the holder 14 use may be made of pins 24 (FIG. 11b) positioned in a circle close to the place of attachment of the pusher to the oscillator.

Figure 12:
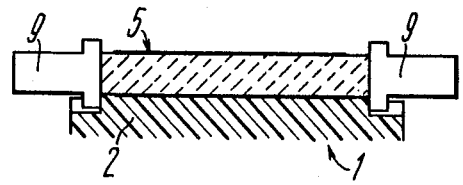

It is also possible to prevent said angular displacement of the oscillator with the aid of projections provided on the pushers (FIG. 8c) so that said projections are pushing against projections or recesses provided on the stator or rotor (FIG. 12).

Figure 13:
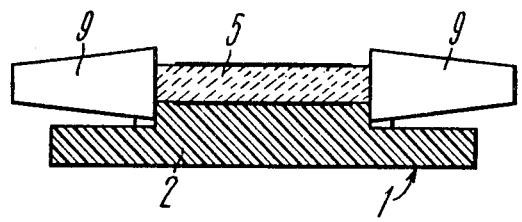

The oscillators having the pushers secured thereon and made in the form of a trapezoidal plate (FIG. 8f, 13) are mounted in a similar manner.

In the proposed motor the piezoelectric oscillator 5 may be mounted either on the stator or the rotor. In this case according to the invention said oscillator is mounted so that the propagation direction of the resonant mode of the longitudinal acoustic vibrations is perpendicular to the surface of frictional interaction. When the oscillation is located on the rotor, the construction of the motor is more complex and the operation thereof is less reliable because of the presence of the current collectors, which is responsible for that the piezoelectric motors wherein the oscillator is mounted on the stator are used more extensively.

In these motors the rotor may be made in the form of a cylinder (FIG. 14a) or a truncated cone (FIG. 14b) which are mounted on the shaft 25 of the motor. Such construction of the rotor is used in the cases when the pushers 9 are secured on the inner cylindrical surface of the oscillator, as shown in FIGS. 6g, h. For the oscillators made substantially in the form of a body of rotation with the pushers located on the outer surface thereof (FIGS. 6e, f, h, i, o), and for the piezoelectric elements made in the form of plates of various shape (FIGS. 6b, c, d) the rotor is preferably made in the form of a sleeve (FIGS. 14c, d) to whose internal cylindrical surface (FIG. 14c) or conical surface (FIG. 14d) are forced the pushers.

Figure 14A:
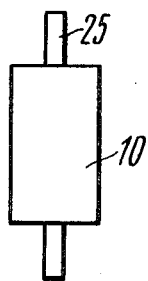
Figure 14B:
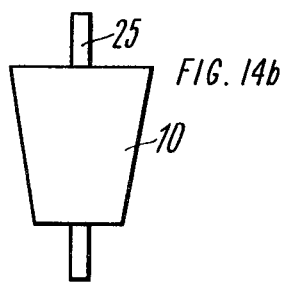
Figure 14C:
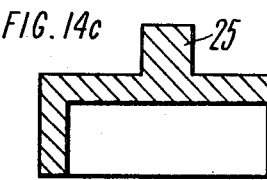
Figure 14D:
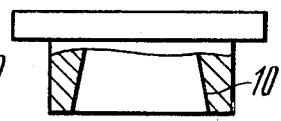
Figure 14F:
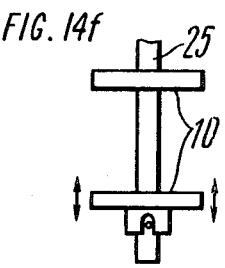
Figure 14E:
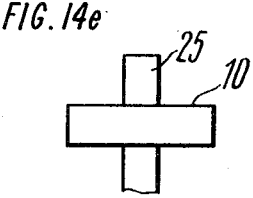

In the case of oscillators wherein the pushers are secured on one end face of the piezoelectric elements (FIG. 6l), the rotor is made in the form of a disc mounted on the shaft (FIG. 14e). For oscillators wherein the pushers are disposed on the both end faces (FIGS. 6k, p) the rotor is provided with two discs mounted on a shaft (FIG. 14f). The pressure of the pushers onto the rotor is controlled by, according to the invention, at least one disc being mounted for axial displacement and being urged against the oscillator with the aid of a spring.

The main requirement placed upon material from which the rotor is made is a high wear resistance. This requirement, however, refers only to that portion of the rotor on which is located the surface of frictional interaction. Therefore from the technological point of view it is expedient that this portion of the motor be made in the form of a wear-resistant ring 26 (as shown in FIG. 15) press-fitted into the body of the rotor. This ring 26 may be made from cast iron, steel, mineral ceramic material, materials based on metal carbides or hard wear-resistant plastic materials, for instance, paper-based laminate. The remainder portion of the rotor may be preferably made from plastic material such as, for instance, diflon.

The pushers are forced to the surface of frictional interaction at the expense of the elasticity of said pushers 9. (FIG. 16a, wherein position of the pushers before they are attached to the ring is shown in dotted line).

If the pushers 9 are made from brittle materials so that they may not be bent, the surface of frictional interaction is made conical (FIG. 16b) or flat (FIG. 16c, d). In this case the pushers are urged against the surface of frictional interaction by the weight of the rotor, as shown in FIG. 16b. (said weight is represented in the drawing by a scale weight) or by a magnetic field (FIG. 16c). The pushers 9 may also be forced to the surface 10 of frictional interaction with the aid of a spring 27, as shown in FIG. 16d.

Applying a load to the proposed motor is effected in a conventional way, for instance, with the use of a shaft 25 (FIGS. 14a, b, c, f, e, FIG. 15, FIGS. 16c, d). To this end use may also be made of the external cylindrical surface of the rotor whereto the load is applied through a belt or a friction wheel (not shown in the drawings). Furthermore, a portion of this surface may be made in the form of a gear wheel (not shown in the drawings).

The free end of each pusher mounted in the oscillator contacts the surface of frictional interaction and is inclined relative this surface at a certain angle $\alpha$ (FIG. 16a).

In the case of a rigid construction of the pushers (not curved) the angle $\alpha$ is an angle formed between the plane of the pusher and a plane tangential to the surface of frictional interaction, running through a contact line between the pusher and said surface.

For curved (elastic) pushers the angle $\alpha$ is an angle formed between the plane tangential to the bent surface of the pusher, running through the line of contact of the pusher and the surface of friction interaction and a plane tangential to said surface running through said line.

The rotation speed $\omega$ of the rotor of the piezoelectric motor and its torque M depend on this angle $\alpha$:

$$\omega = K_1 U / \cos \alpha \qquad (1)$$

$$M = K_2 U \cos \alpha \qquad (2)$$

where $K_1$ and $K_2$ are coefficients depending on the construction of the motor;

U is a supply voltage.

As the pushers wear, the angle α increases, and therefore it is advisable that the angle α be selected in the range of from 40° to 50°. It is also expedient that the angle α for all the pushers be equal. Such construction rules out slippage of the pushers during operation of the motor.

Figure 17:
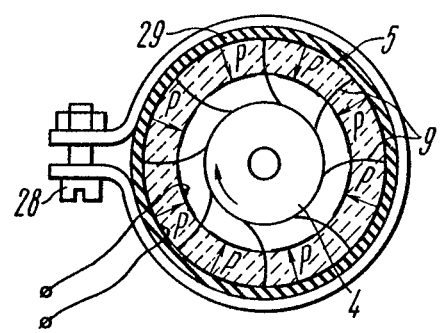
FIG. 17 is a sectional view, showing a modification of the proposed motor wherein the oscillator is made from separate portions of a ring.
Figure 18:
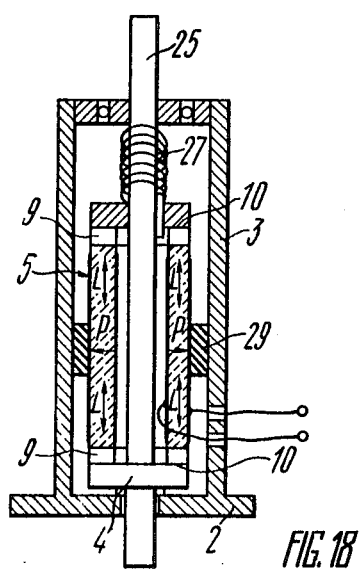
FIG. 18 is a sectional view, showing another modification of the proposed motor wherein the pushers are secured on the end faces of the cylindrical oscillator.
Figure 19:
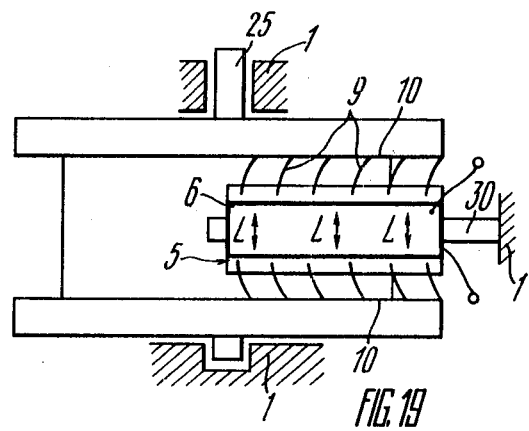
FIG. 19 shows a modification of the proposed motor wherein the rotor is made in the form of two discs rigidly connected with each other.

As can be inferred from the above description of embodiment of the invention the proposed motor of the invention may be variously constructed as is shown, for instance, in FIGS. 17, 18, 19.

Referring now to FIG. 17, the proposed motor comprises the oscillator 5 being made from portions of rings between which are disposed the pushers 9. This oscillator 5 is tightened by a rim with the aid of a bolt 28.

To decrease acoustic losses a rubber sound-proofing layer 29 in the form of a ring is provided between said rim and the oscillator 5. Such construction of the oscillator allows its volume to be increased without unnecessary losses of piezoelectric material used for manufacturing the piezolectric element.

Shown in FIG. 18 is another modification of the proposed motor which comprises an oscillator 5 made in the form of a hollow cylinder, as shown in FIG. 6k, on the both end faces of which cylinder are mounted the pushers 9, each said pusher being secured at its one end; the direction of the resonant mode of the longitudinal vibrations in this oscillator is parallel to the generating line of the cylinder, as shown in FIG. 18. The rotor 4 has a shaft 25 and two coaxial discs mounted on the shaft 25.

On the end faces of the discs, facing the oscillator 5 are located the surface 10 of frictional interaction, against which surfaces are urged the free ends of the pushers 9. It is quite evident that according to this modification there are provided two surfaces 10 of frictional interaction, each said surface being perpendicular to the direction of the resonant mode of the longitudinal vibrations. One of the discs is mounted on the shaft 25 for displacement along the axis thereof and is forced to the oscillator 5 by a spring 27. The oscillator 5 is secured in the body 3 of the motor with the aid of a sound-proofing layer 29 made in the form of a ring.

A peculiar construction of the proposed motor is shown in FIG. 19. The oscillator 5 of this motor has a piezoelectric element 6 made in the form of a plate (FIG. 6a), on the lateral faces of which are secured pushers 9 each at its one end. It is to be noted that the piezoelectric element 6 (FIG. 19) may also be made in the form of a portion of a cylinder, as shown in FIG. 6k. The rotor 4 has two discs rigidly connected to each other. On the end faces of said discs, facing the oscillator 5 are located two surfaces 10 of frictional interaction. The oscillator 5 is mounted with the aid of a fastening element 30 within the space between said two discs so that the free ends of the pushers 9 are forced to said surfaces of these discs, facing each other, with the element 30 being disposed on the stator 1 of the motor.

Presented in FIGS. 20, 21 is one more modification of the proposed motor which comprises an oscillator 5 with a piezoelectric element 6, shaped as a rectangular plate, whereas in FIGS. 22, 23 it is shaped as a square bar.

The characteristic feature of these modifications is that the proposed motor further includes an additional rotor 31 on which is located an additional surface 32 of frictional interaction. The rotor 31 is mounted on an additional shaft 33. In this case a number of the pushers 9 have their free ends urged against the surface 32 and their other ends secured on the oscillator 5. In these modifications the resonant mode of the longitudinal vibrations is excited along the length of the oscillator, and the direction of its propagation is perpendicular to both the surfaces 10 and 32.

Figure 24:
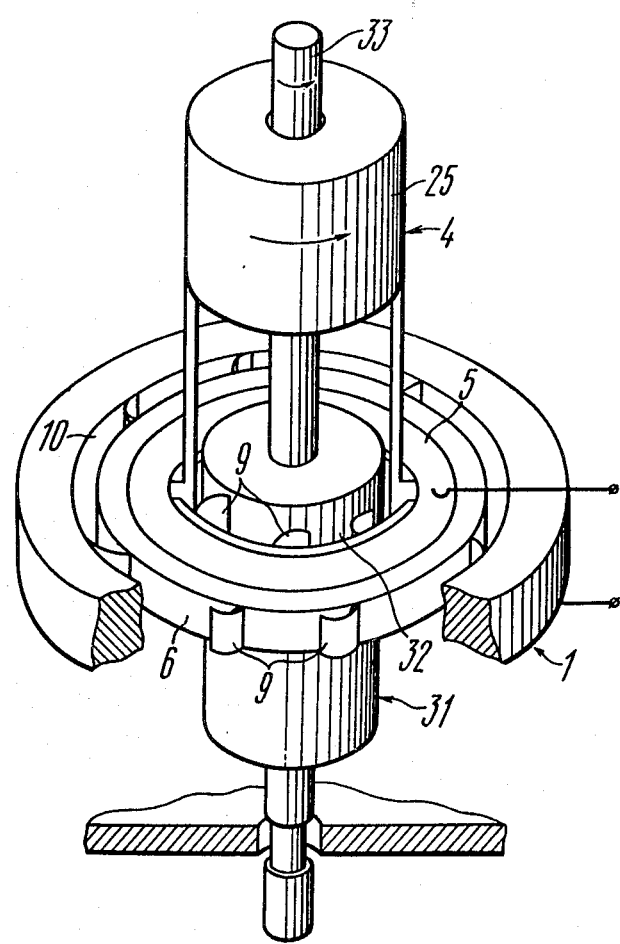
FIG. 24 shows a modification of the proposed motor wherein there are provided additional pushers mounted on the inner surface of a cylindrical oscillator.

Shown in FIG. 24 is a modification of the proposed motor, wherein according to the invention the oscillator 5 includes a piezoelectric element 6 made in the form of a ring on the internal and external surfaces of which are secured pushers 9. The oscillator 5 is mounted for rotation relative the stator 1 and is coupled with the shaft 25. The stator 1 has a surface 10 of frictional interaction to which are forced the pushers 9 disposed on the external cylindrical surface of the piezoelectric element 6, said oscillator 5 mounted on the shaft 25 being in fact a rotational part, i.e. rotor 4, of the motor. According to the invention the motor is provided with an additional rotor 31 on which there is provided an additional surface of frictional interaction 32 against which are pushing the pushers 9 located on the internal cylindrical surface of the piezoelectric element 6. The rotor 31 is made in the form of a solid cylinder mounted on an additional shaft 33.

Figure 25:
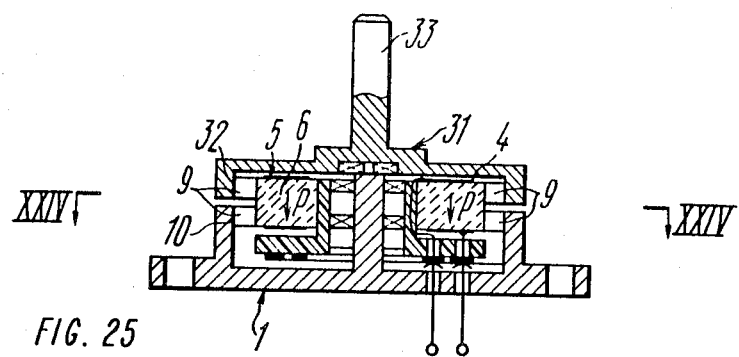
FIG. 25 is a sectional view, showing another modification of the proposed motor, wherein there are provided additional oscillators mounted on the outer surface of a cylindrical oscillator.
Figure 26:
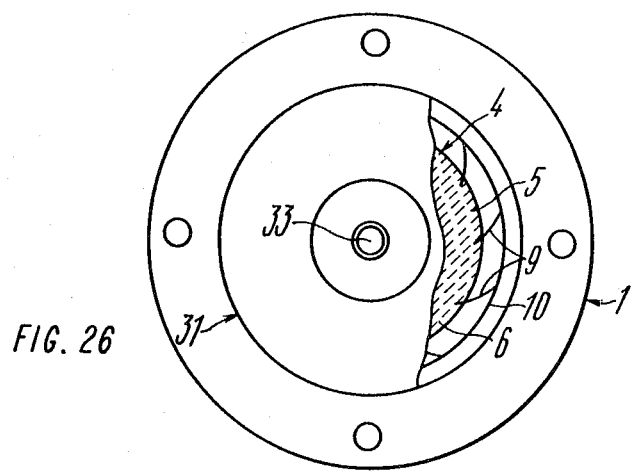
FIG. 26 is a sectional view taken along line XXVI-—XXVI in FIG. 25.

According to this modification of the proposed motor, shown in FIGS. 25, 26, the oscillator 5 is mounted on the stator 1 for rotation. The pushers 9 are secured on the external cylindrical surface of the piezoelectric element 6 and are positioned in a circle in two rows. The oscillator 5 is substantially the rotor 4 of the motor. One row of the pushers 9 are forced to the surface 10 of frictional interaction located on the stator 1, while the other row of the pushers 9 are forced to the additional surface 32 of frictional interaction located on the additional rotor 31 made in the form of a sleeve coupled with the shaft 33 of the motor.

The pushers 9 (FIG. 27) may have identical or opposite signs of angles α at which free ends of the pushers 9 engage the corresponding surfaces of frictional interaction. (The sign of the angle α is taken as positive if this angle increases in a clockwise direction, and as negative if said angle increases in a counter-clockwise direction). If these angles α have identical signs, (FIG. 27a), the rotational speed of the shaft is lowered close to zero and, if said signs are opposite (FIG. 27b), said speed of rotation is doubled.

The motor of the invention may operate both in a continuous and a stepwise mode. In the case of a stepwise mode the motor is provided with a converter 34 (FIGS. 28, 29, 30), adapted for converting discrete angular positions of the rotors to electric signals and electrically connected with a supply source of the oscillator.

Figure 28:
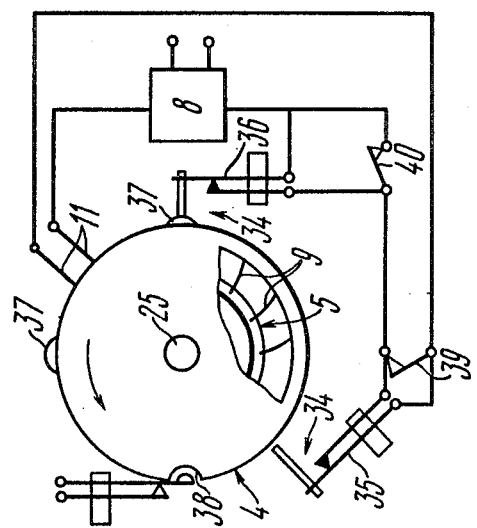
FIG. 28 shows a modification of the proposed motor having a converter adapted to convert angular discrete positions of the rotor into an electric signal.

One of the alternative modifications of this converter 34 is shown in FIG. 28, wherein the converter 34 has several pairs of contacts 35, 36 movably interacting with one or several projections 37 or recesses 38 provided on the rotor 4. The converter 34 is also provided with starting contacts 39, 40 of the motor.

Figure 29:
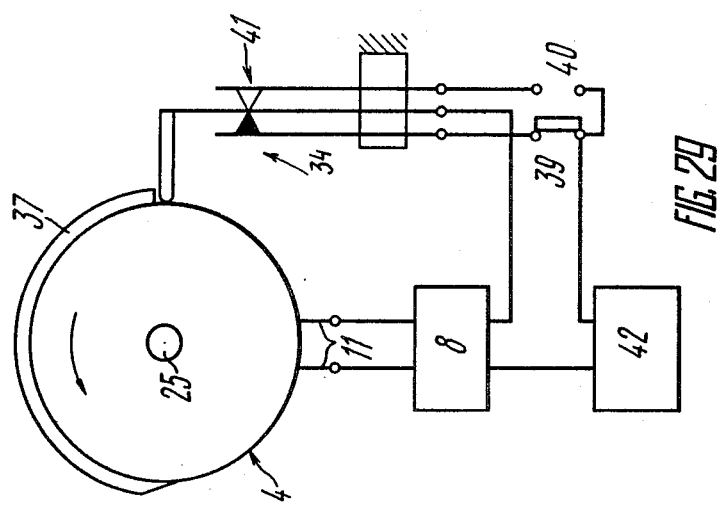
FIG. 29 shows another modification of the device illustrated in FIG. 28.

In the present description there is proposed one more modification of the converter 34 (FIG. 29). In this modification in order to decrease the number of contacts the projection 37 (or the recess) is made extended, in which case the extended projection 37 interacts with a group of contacts 41 consisting of three contacts. The contact group 41 is connected to a direct voltage source 42 supplying alternative voltage source 8 adapted to excite acoustic vibrations in the oscillator of the motor.

According to still another embodiment of the invention (FIG. 30) the converter 34 is connected to a starting device 43 to start and stop the rotor 4. The simplest construction of the starting device 43 is a key intended to connect said supply source 8 connected to the source 42 to the oscillator of the motor or the source 8, connected to the oscillator of the motor to the supply source 42.

The converter 34 may be made in the form of a reed relay 44 and a connected-in-series and additional supply source 45 of direct voltage. FIG. 30, wherein are also shown the other modification of the converter 34.

In order to improve reliability in operation the converter 34 may be made contactless, for instance, of induction type with the use of an inductance coil 46 of a magnetic diode 47. Use may also be made of an optron pair (in FIG. 30 not shown).

In a modification of the proposed motor shown in FIGS. 31, 32 said motor is further provided with a reversible rotor 48 mounted coaxially with the rotor 4 and being capable of rotating relative the rotor 4. The motor also includes two additional oscillators 49, 50 made in the form of rectangular plates having pressure elements 51, 52, for instance, flat springs. The elements 51, 52 are movably connected with the rotor 4 with the aid of a pin 53 and provide alternate frictional interaction of the oscillators 49, 50 with the rotor 4. The rotor 4 is provided with the projection 37 which movably interacts with the contact group 41. The oscillators 49 and 50 of the motor are alternately connected to an additional voltage supply source 54 with the aid of switch 55 which is capable of movably interacting with the projection 37. The connection diagram for connecting the oscillator 5 to the supply source 8, and the supply source 8 to the supply source 42 is similar to that shown in FIG. 29.

The proposed piezoelectric motor operates in the following way. An alternating voltage with a frequency equal or close to the resonant mode of the longitudinal vibrations of the oscillator 5 is applied from the voltage supply source 8 (FIG. 1) to the electrodes 7 of the piezoelectric element 6, normally polarized to the surface of electrodes in; which piezoelectric element at the expense of the reverse piezoelectric effect there occurs a deformation of the domain particles. As a result, in the piezoelectric element there is produced a longitudinal shifting wave, since the wave front of this wave propagates in the direction in which the particles are displaced. The wave of particle displacement reaches the bounding surfaces of the piezoelectric oscillator and is partially reflected therefrom, and partially penetrates the pushers 9. The portion of the wave moving in the pushers 9 reaches the free end thereof and is partially reflected therefrom and partially converted into lateral vibrations as a result of interaction with the surface 10, in this particular case into bending vibrations of the free end of the pusher 9 urged against the rotor. The thus reflected longitudinal vibration waves move back to the piezoelectric element 6, wherein, combining with the waves excited in said element, they form standing waves whose amplitude is maximum at the resonant frequency along the length of the oscillator 5, in the direction of propagation of the resonant mode of vibrations.

The thus generated waves of lateral (flexural) vibrations propagate to the location of attachment of the pusher to the piezoelectric element and almost entirely reflect therefrom to start moving back. These waves are combined with the excited flexural waves to form standing waves of the flexural vibrations in the pushers. The standing waves of the longitudinal and flexural vibrations cause the free end of the pusher to displace, or more precisely, of the points of the pusher, which points of the pusher contact the surface of friction interaction when the motor is deenergized, so that these points move to and fro along said surface during one period of vibration. The force with which these points are pressing on the surface of frictional interaction depends on the shift in phases between longitudinal and lateral vibrations. If this phase shift is zero the mean force with which the pusher is urged against said stator will be equal in both directions, and therefore an average tangential force acting between the stator and rotor will also be equal to zero. If the phase shift is other than zero, the mean force produced, when the pusher end is moving in one direction, is not equal to a mean force produced when said pusher end is moving in the opposite direction, which results in that in one period of vibration of the oscillator 5 there is produced a unidirectional pulse of a tangential force which, when applied to the rotor and combined with the pulses of other periods, causes the rotor to unidirectionally rotate.

A zero phase shift between the longitudinal and lateral vibrations determines an unstable state of the system, so that a slight change in the exciting frequency of the oscillator is sufficient to produce a phase shift differing from zero. When the supply frequency is corrected again to its initial value the phase shift once appeared never disappears, since during the rotor rotation a certain reactance is introduced into the oscillator from that portion of the motor where is located the surface 10 of frictional interaction, which reactance changes the phase shift between the longitudinal and flexural vibrations.

As follows from the above explanation the direction of rotation of the rotor depends on the phase shift sign as the phase is shifted from zero to $2\pi$. This is true for high supply voltages when the normal pressure force the pushers exert onto the surface 10 of frictional interaction is lower than the force produced by the normal components of the longitudinal and flexural vibrations. In practice, however, it is not expedient to satisfy this condition, since in this case either the pressing force of the pushers has to be decreased, thereby decreasing of the torque, or the piezoelement is caused to be overloaded which may result in the distruction thereof.

Therefore, the pressure force of the pushers is selected experimentally so as to provide a maximum efficiency and torque, in which case the pressure of the pushers on the stator at the expense of elasticity of the pushers should be higher than a normal component of the pressure exerted by the end of the pusher on the surface of frictional interaction, caused by elastic vibration waves. In this case the rotor rotates only in one direction shown in FIGS. 1, 2.

The motor wherein the oscillator 5 is mounted on the base 2, as shown in FIG. 3, operates in a similar manner as described above, except that there is no need for a current collector, since the oscillator 5 in this case is stationary relative the stator 1 and hence relative the supply source 8. Since the operation of the proposed motor of all the possible modifications is similar to that described above, considered below are only those particular features in the operation of the motor, which are associated with specific constructions thereof.

The proposed motors are so constructed that longitudinal vibrations are electrically excited (that is under the action of an electrical potential) in the oscillator, and which vibrations are partially mechanically (that is at the expense of frictional contact) converted to lateral vibrations which being combined with the longitudinal vibrations causes the rotor to rotate.

However, in order to electrically excite longitudinal vibrations in the oscillator, vibrations must be first excited in the piezoelectric element. The type of the excited vibrations does not depend on the shape of the piezoelectric element. Therefore the latter may be selected depending on the specific requirements placed upon the motor. For instance, for a flat-shape motor the piezoelectric element should be made in the form of a thin disc, as shown in FIG. 5f, a ring, as shown in FIG. 5d, j, or a square plate, as shown in FIG. 5a. For a rod-type motor the piezoelectric element is made in the form of a bar (FIG. 5e) or a cylinder (FIG. 5i). For low-power motors having a relatively high torque the piezoelectric element is made in the form of a plate, as shown in FIG. 5a, b a portion of a ring, as shown in FIG. 5c, or a portion of a hollow cylinder, as shown in FIG. 5g. In the case of high-power motors the piezoelectric element is made from separate blocks, prisms, rings, discs, etc. (FIG. 5d, k), in which case the strength of joint of said components is increased by a shell 17 (FIG. 5d) press-fitted on the piezoelectric element. Whatever the construction of the piezoelectric element may be, the electrodes 7 are applied on the two opposite surfaces of said element and the piezoelectric element is polarized by applying to said electrodes a direct voltage having intensity exceeding a coercivity of the piezoceramic material used. The direction of such polarization is perpendicular to the surfaces of the electrodes 7, which is a necessary condition for exciting longitudinal elastic vibrations in the piezoelectric element and hence in the oscillator.

In each of the modifications of the piezoelectric element being considered the resonant modes of longitudinal vibrations may be excited in several directions: for a plate—along the length, across the width, and through the thickness thereof; for a disc—along the radius and through the thickness thereof; for a ring—along the radius and width, and through the thickness thereof.

To cause the longitudinal vibrations to spread from the piezoelectric oscillator to the pushers, the pushers should be fastened on the surfaces mostly along the direction of the resonant mode of longitudinal vibrations. As shown in FIG. 6a the longitudinal vibrations in the piezoelectric element 6 must be excited across the width of the plate, since the pushers are fastened on its lateral faces (end faces). If the vibrations are excited along the length of the plate, as shown by the dotted arrow, said vibrations will not propagate into the pushers 9. In the bar shown in FIG. 6c the vibrations are excited along the length thereof. In this case the vibrations, excited across the width or through the thickness of said bar, do not spread onto the pushers 9. In the piezoelectric element having the pushers 9 secured on the ribs (FIG. 6b) the longitudinal vibrations are propagating in the pushers both when the vibrations in the piezoelectric element are excited along the length and along the width thereof.

In a square plate (FIG. 6d) and prism (FIG. 6o) the longitudinal vibrations are excited along the diagonal, side of a square or prism. In this case the resonant frequencies in these two directions are not practically distinguished because of a strong mechanical coupling between the resonances in said directions.

In discs (FIG. 6i, e) and rings (FIG. 6g, h, f) the longitudinal vibrations are excited radially. In rings (FIG. 6g, h, f) apart from radial vibrations, it is possible to excite longitudinal vibrations across the width of the ring.

In thin-walled cylinders (FIG. 6k, p) or cylinder portions (FIG. 6n) the pushers are difficult to secure on the cylindrical surfaces. Therefore it is advisable that these pushers be secured on one end face, as shown in FIG. 6l, or two end faces, as shown in FIG. 6p, k.

To excite longitudinal oscillations in the pushers in the case of thin-walled cylindrical piezoelectric elements (FIG. 6l, p, k), the longitudinal oscillations are excited along the generating line of a cylindrical surface.

Such oscillators are similar to those made in the form of a bar (FIG. 6m) or a plate (FIG. 6q) with narrow pushers fastened on their end faces. It should be noted that hollow cylindrical oscillators have the advantage that the shaft 25 (FIG. 18) of the rotor 4 may be disposed inside of such oscillators.

The direction of propagation of the resonant mode of longitudinal vibrations determines the operating frequency which may be found from the equation:

$$f = N/S, \tag{3}$$

where S is a distance between the surfaces of the piezoelectric element, perpendicular to the direction of the resonant mode of the longitudinal vibrations (in the case of the radial vibrations this distance is equal to the diameter of the disc or ring), if the oscillator has a shell, S is the diameter of said shell; N is a frequency constant of the piezoceramic material used.

In principle, the presence of the shell on one of the cylindrical surfaces of the piezoelectric element (FIGS. 5d, 6g, i) does not influence the operation of the motor. The elastic vibrations are freely propagating from the piezoelectric element to said shell and further to the pushers if any (FIG. 6i).

The motor torque may be somewhat increased by making the shell in the form of a rim or a bush with the width thereof being a multiple of λ/2, that is half the length of the longitudinal vibration wave. A higher speed of rotation and better matching of load of the rotor with the oscillator can be achieved by the shell being constructed so that its thickness decreases with the increase in its diameter (FIG. 6j), which improves the efficiency of the motor.

The operation of the motor is influenced neither by the shape of the pushers 9, manner of how these pushers are fastened to the piezoelectric element, or the number of the pushers. It has not been observed, for instance, that the parameters of the motors are influenced by a manner in which the pushers are secured. With the increase in the number of the pushers 9 the motor torque also increases, which leads to the increase of the supply voltage. The presence of a wear-resistant layer 20 (FIG. 7a, b) decreases the wear rate of the pushers, and if this layer is made from plastic material the level of noise of the motor is also decreased.

As shape of the pushers (FIG. 8) does not substantially influence the parameters of the motor, it favours a freedom in taking decisions as regards the construction of the motor, and especially in solving technological problems.

For instance, if technologically the holder 14 (FIG. 11a) of the oscillator in the form of an annular projection with grooves is difficult to manufacture, then the pushers are made having projections (FIG. 8c), or of a trapezoidal shape (FIG. 8f). The base 2 (FIGS. 12, 13) of the stator 1 is provided with grooves into which are inserted said projections of the pusher or angular edges of the latter if it has a trapezoidal shape.

The strength of bond between the piezoelectric element and the pusher (FIG. 8d, e) can be increased by providing the pusher with slits or holes for the adhesive to get into and to thereby provide an additional strength to the joint between said element and said pusher.

Figure 9A:
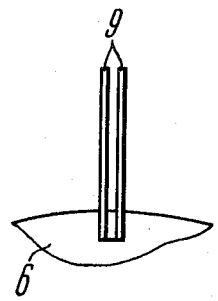
FIG. 9 shows various modifications of multilayered pushers.
Figure 9B:
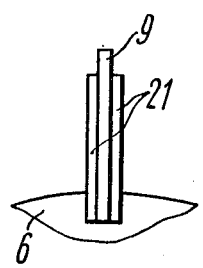
Figure 9C:
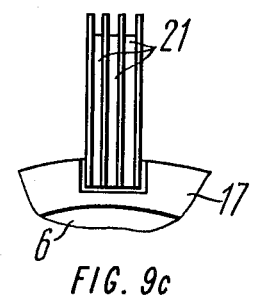

The number of the grooves may be decreased without altering the parameters of the motor, which is attained by two or several pushers being inserted into one groove (FIG. 9a). The presence of the sound-proofing layer 21 on the pushers (FIG. 9a, b) enables abating the noise resulting from surface roughness of the cylindrical surface 10 of frictional interaction between the stator and rotor.

When the resonant mode of longitudinal vibration is excited in the oscillator a portion of an acoustic energy is absorbed by the mounting of the oscillator thereby reducing the efficiency of the motor. In order to reduce these losses the conical holders 22 (FIG. 10a) are made from sound-proofing material. The holders 22 are triangular in cross-section with a vertex of said trinangle pushing against the oscillator. Even less energy is absorbed when the oscillator 5 is mounted in the holder with a small spacing relative the walls thereof (FIG. 10b).

The maximum vibration amplitudes of the oscillator are normally found in the range of 5-30 microns, and therefore roughness of the surface of frictional interaction should be less than one micron. Ideally, this surface should be ideally smooth. The less the roughness of said surface the less are acoustic noises produced by the motor. Taking account of these specific requirements and for convenience of machining the surfaces of frictional interaction are made cylindrical, conical, or flat. In the first and the second cases this surface is made, as a rule, coaxial with the motor shaft, if any.

If the rotors are made in the form of discs on which are located flat surfaces 10 of frictional interaction (FIG. 14e, f) the pushers 9 may be made from plastic material. Such pushers cannot elastically bend, and therefore in operation the disc of the rotor has to be urged against the pushers 9. Urging the rotor disc against the pushers is effected with the aid of pressing members, for instance, such as a spring 27 (FIGS. 16d, 18).

If the discs are rigidly fixed, as shown in FIG. 19, the pushers 9 are forced to the surface 10 at the expense of their own elasticity. Such pushers, however, as they wear they straighten out, in which case the contact angle $\alpha$ increases, which is responsible for the service life of such motors being shorter than that of the motors having a disc mounted for axial displacement (FIGS. 16d, 18), due to which the contact angle $\alpha$ remains constant as the pushers wear out.

It should also be noted that, according to the invention, the motor may be provided with two or more oscillators, in which case, for instance, the oscillators made in the form of a disc or ring may be assembled in a stack and located in a cylindrical rotor made in the form of a tube. Such construction of the motor allows the motor torque and power to be increased proportionally to the number of the oscillators used.

The presence in the motor of a second rotor (FIGS. 21, 22, 23, 24) does not alter operational conditions. The torque to the both rotors is transmitted from one and the same oscillator. If necessary, and provided that angles $\alpha$ have identical signs, the shafts of the rotors may be coupled with each other. In this case such rotor becomes equivalent to the rotor for instance, which has two discs (FIG. 19). When manufacturing motors having two rotors it is necessary to take into account that each rotor causes in the oscillator a certain degree of damping, and therefore they cannot be considered as working independently. Changing the load applied to one of them inevitably brings about a change in the rotational speed of the other one.

Figure 27A:
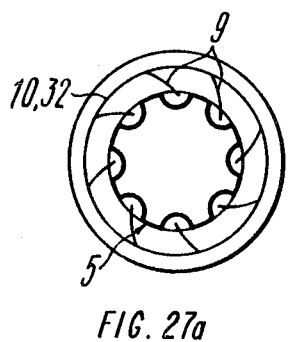
FIG. 27 shows various ways of mounting the pushers on the piezoelectric oscillator.
Figure 27B:
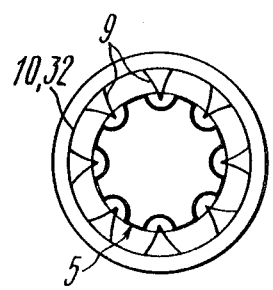

Another characteristic feature, which is worth mentioning, manifests itself during operation of the motor provided with two rotors 4,31 (FIGS. 25, 26) one of which includes an oscillator 5. The oscillator 5 of this motor imparts rotational motion to an additional rotor 31, and since said oscillator is located on the rotor 4, it rotates relative the stator 1. The resultant rotational speed of the shaft 25 is equal to the sum or different of the speeds of rotation of the rotor 31 and the rotor 4. If the directions of rotation of the rotors 4 and 31 coincide their speeds of rotation are summed, and, if said rotors are rotating in opposite directions, their rotational speeds are subtracted. Shown in FIG. 27a is the angle $\alpha$ which corresponds to subtraction of the rotational speeds. In order that these speeds are summed, the sign of the angle $\alpha$ at which the pushers 9 engage one of the surfaces 10 or 32 must be changed to an opposite one (FIG. 27b). In the case when the rotational speeds are subtracted, the minimum r.p.m. of the shaft 25 is determined by the ratio of the diameter of the surface 10 to that of the surface 32.

Below are also given some characteristic features in the operation of the proposed motor shown in FIG. 28. The supply source 8 is generating an alternating voltage to excite in the oscillator 5 longitudinal acoustic vibrations. When the contacts 40 are closed, said voltage from the source 8 is applied through the contacts 40 and closed contacts 35 to the leads 11 of the oscillator 5, in response to which the rotor 4 starts rotating in the direction shown by the arrow. One of the projections 37 releases the contacts 36 thereby allowing them to close. Thereafter the contacts 40 may be caused to open as they are interlocked by the contacts 36 and the rotor continues to rotate. The second projection 37 reaches the contacts 35 to cause them to open and to thereby disconnect the supply circuit of the oscillator so that the rotor 4 of the motor after having rotated to a certain angle is stopped. To start it again it is necessary to close the starting contacts 39.

The piezoelectric motor shown in FIG. 29 operates as follows. A direct voltage from the direct voltage source 42 is applied through contacts 39 and the closed contacts of the contact group 41 to the input of the supply source 8, which direct voltage is converted therein into alternating voltage to excite the oscillator of the motor. As a result the rotor 4 starts rotating in the direction shown by the arrow. When the projection 37 approaches the contact group 41, the previously closed contacts of this contact group 41 open while the open contacts are caused to close, in response to which the supply circuit of the oscillator is disconnected to thereby stop the rotor 4. Starting the motor again is done by closing the starting contacts 40, whereafter the rotor 4 will continue to rotate until the projection 37 disengages the contact group 41, thereby disconnecting the supply circuit and thus stopping said rotor again.

When the rotor of the motor shown in FIG. 30 rotates, it reaches certain angular positions wherein the converter 34, for converting angular discrete positions of the rotor to electric signals, alters intermittently the voltage of the direct voltage source 45 thereby effecting in the unit 43 connection and disconnection of the motor. Varying electric voltage may be effected, for instance, by closing the contact of the reed relay 44 by approaching thereto a permanent magnet. If the converter 34 is made in the form of an induction coil 46 with a core, the magnet moved close to the coil 46 causes the inductance of said coil to alter and a magnetic e.m.f. is induced therein, which e.m.f. is used as a control signal applied to unit 43; when a permanent magnet is moved close to the magnetic diode 47, the resistance of said diode alters as a result of which the voltage and current at the output of the unit 43 also alters. The above angular position converters are contactless; that is, they do not have mechanical contacts (optical sensors and capacitive sensors also relate to this type of converters).

The simpler and less expensive converters of the above type are contact pickups (in FIGS. 28, 29 these are contacts 35, 36, and 41).

The use of said converters makes it possible to obtain high torques and accurate angular positioning, which is embodied in the reverse motor shown in FIGS. 31, 32. In this motor, alternating electric voltage is applied from the additional supply source 54 to the oscillator 49 urged by the element 51 to the reversible rotor 48 so as to cause the latter to rotate, thereby rotating the shaft 25 of the motor.

When the starting contacts 39 are closed, the electric voltage from the supply source 8 is applied to the oscillator 5, as shown in FIG. 29, in response to which the rotor 4 starts rotating in the direction shown in FIG. 32 by the arrow. The pin 53 which is rigidly attached to the rotor 4 releases the spring 52, whereafter the spring urges the oscillator 50 against the rotor 48. While moving further said pin compresses the spring 51, thereby disengaging the oscillator 49 and the rotor 48 from one another. The rotor 48 stops rotating. The projection 37 diconnects through the contact group 41 the supply circuit of the oscillator 5, thereby causing the rotor 4 to stop. If now the position of the switch 55 is changed, the voltage from the source 54 will be applied to the oscillator 50 which will impart rotational motion to the rotor 48, in which case the rotor 48 will rotate in opposite direction. Changing the rotation direction is effected by closing the contacts 40 and changing the position of the switch 55. Changing the position of the switch 55 can be effected automatically by the projection 37 which is achieved by the switch 55 being made in the form of contacts interacting with the projection 37.

The proposed motors can be used as low-speed motors having 600 r.p.m.$^{-1}$ and even lower without the use of reduction gears. They are capable of developing torques up to 100 kg per cm and even higher, with their efficiency exceeding 30%. The proposed motor can operate in a stepwise mode providing for a minimum size of step equal to 0.5-–1 angular seconds. A time constant of such motors reaches up to $0.05 \div 0.1$; $10^{-3}$ sec.

While particular embodiments of the invention have been shown and described, various modifications thereof will be apparent to those skilled in the art and, therefore, it is not intended that the invention be limited to the disclosed embodiments and departures may be made therefrom within the spirit and scope of the invention as defined in the claims.

We claim:

1. A piezoelectric motor comprising a stator and a rotor, one of said stator and rotor including at least one piezoelectric oscillator; said stator and rotor contacting each other along at least one frictional interaction surface; said piezoelectric oscillator having a piezoelectric element made from a piezoelectric material, and electrodes disposed on the opposite surfaces of said piezoelectric element; a supply source connected to said electrodes for exciting resonant mode of longitudinal vibrations in said piezoelectric oscillator; at least two pushers each having one end secured on said piezoelectric oscillator and the other end forced to said frictional interaction surface; said piezoelectric element being polarized in the direction perpendicular to the surfaces of said electrodes and being positioned so that the propagation direction of said resonant mode of longitudinal vibrations is perpendicular to said frictional interaction surface.

2. A piezoelectric motor according to claim 1, wherein said piezoelectric element is made in the form of a rectangular plate.

3. A piezoelectric motor according to claim 1, wherein said piezoelectric element is made in the form of a square bar.

4. A piezoelectric motor according to claim 2 or 3, wherein said pushers are secured at least on one end of said piezoelectric element.

5. A piezoelectric motor according to claim 2 or 3, wherein each said pusher is secured at least on one of parallel ribs of said piezoelectric element.

6. A piezoelectric motor according to claim 1, wherein said piezoelectric element is made substantially in the form of a cylinder.

7. A piezoelectric motor according to claim 1, wherein said piezoelectric element is made in the form of a ring.

8. A piezoelectric motor according to claim 6 or 7, wherein said pushers are secured at least on one end face of said piezoelectric element.

9. A piezoelectric motor according to claim 6 or 7, wherein said pushers are secured at least on one cylindrical surface of said piezoelectric element.

10. A piezoelectric motor according to claim 1, wherein said piezoelectric element is made in the form of a disc.

11. A piezoelectic motor according to claim 10, wherein said pushers are secured on the cylindrical surface of said disc.

12. A piezoelectric motor according to claim 1, wherein said piezoelectric element is made in the form of a portion of a ring.

13. A piezoelectric motor according to claim 1, wherein said piezoelectric element is made substantially in the form of a portion of ring.

14. A piezoelectric motor according to claim 12 or 13, wherein said pushers are secured at least one end face of said piezoelectric element.

15. A piezoelectric motor according to claim 12 or 13, wherein said pushers are secured on the cylindrical surface of said piezoelectric element.

16. A piezoelectric motor according to claim 1, wherein said piezoelectric element is made in the form of a body composed from prisms having a shape close to a cylinder.

17. A piezoelectric motor according to claim 16, wherein said pushers are secured on parallel ribs of said piezoelectric element.

18. A piezoelectric motor according to claim 16, wherein said pushers are secured at least on one end face of said piezoelectric element.

19. A piezoelectric motor according to claim 1, which further includes at least one shell enveloping at least one of the lateral surfaces of said piezoelectric element.

20. A piezoelectric motor according to claim 19, wherein the difference between the inner and the outer diameter of said shell is a multiple of half the length of the resonant mode wave longitudinal vibrations.

21. A piezoelectric motor according to claim 19, wherein said shell is made in the form of a concentrator of stresses.

22. A piezoelectric motor according to claim 19, wherein said pushers are secured on said shell.

23. A piezoelectric motor according to claim 1, wherein grooves are provided in said piezoelectric element, with said pushers being mounted within said grooves.

24. A piezoelectric motor according to claim 1, wherein said pushers are secured on said piezoelectric element with the use of a compound.

25. A piezoelectric motor according to claim 1, wherein said pushers are made in the form of plates of a uniform thickness.

26. A piezoelectric motor according to claim 1, wherein said pushers are made in the form of plates of a variable thickness.

27. A piezoelectric motor according to claim 25 or 26 wherein said plates are made rectangular.

28. A piezoelectric motor according to claim 25 or 26, wherein said plates are made trapezoidal.

29. A piezoelectric motor according to claim 1, wherein said pushers have a multilayer structure.

30. A piezoelectric motor according to claim 29, wherein a sound-proofing layer is provided between said layers of said pushers.

31. A piezoelectric motor according to claim 1, wherein said pushers are made in the form of rods.

32. A piezoelectric motor according to claim 1, wherein the free ends of said pushers are provided with wear-resistant layers.

33. A piezoelectric motor according to claim 1, wherein the length of said pushers is a multiple of a half the length of the resonant mode wave of longitudinal acoustic vibrations.

34. A piezoelectric motor according to claim 1, wherein the stator includes said piezoelectric oscillator and said rotor is made in the form of a cylinder against the lateral surface of which are urged the free ends of said pushers.

35. A piezoelectric motor according to claim 1, wherein the stator includes said piezoelectric oscillator, and said rotor is made in the form of a truncated cone against the lateral surface of which are urged the free ends of the pushers.

36. A piezoelectric motor according to claim 1, wherein the stator includes said piezoelectric oscillator and said rotor is made substantially in the form of a hollow cylinder inside of which is mounted said oscillator.

37. A piezoelectric motor according to claim 1, wherein said rotor includes at least one disc, with said pushers being urged against one of the surfaces of said disc.

38. A piezoelectric motor according to claim 37, wherein at least one of said discs is mounted for axial displacement and is forced to said piezoelectric oscillator with the aid of a spring.

39. A piezoelectric motor according to claim 1, wherein said motor is further provided with an additional rotor including an additional surface of frictional interaction against which are urged the free ends of additional pushers having their other ends secured on said oscillator.

40. A piezoelectric motor according to claim 39, wherein the angles at which the free ends of said pushers engage two said surfaces of frictional interaction have identical signs.

41. A piezoelectric motor according to claim 39, wherein the angles at which the free ends of said pushers engage two said surfaces of frictional interaction have opposite signs.

42. A piezoelectric motor according to claim 1, wherein said motor further includes a converter adapted to convert angular discrete positions of said rotor to electrical signals, said converter being electrically connected to said supply source.

43. A piezoelectric motor according to claim 1, wherein said stator includes said piezoelectric oscillator and said motor is further provided with a reversible rotor mounted coaxially with said rotor of said motor for rotation relative said rotor, two piezoelectric oscillators made in the form of rectangular plates and each having one end secured on said stator and two pressing members movably connected to said rotor of the motor and adapted to provide and alternate frictional interaction between the other ends of said plates and said reversible rotor.

* * * * *